United States Patent
Dahl et al.

(10) Patent No.: US 10,028,483 B1
(45) Date of Patent: Jul. 24, 2018

(54) CORNER FEEDER BRACKET

(71) Applicants: Terrie Hart Dahl, Fargo, ND (US);
Brian E. Dahl, Fargo, ND (US)

(72) Inventors: Terrie Hart Dahl, Fargo, ND (US);
Brian E. Dahl, Fargo, ND (US)

( * ) Notice: Subject to any disclaimer, the term of this patent is extended or adjusted under 35 U.S.C. 154(b) by 0 days.

(21) Appl. No.: 15/491,098

(22) Filed: Apr. 19, 2017

Related U.S. Application Data (60) Provisional application No. 62/324,732, filed on Apr. 19, 2016.

(51) Int. Cl.
| | | |
|---|---|---|
| *A47K 1/08* | (2006.01) |
| *A01K 5/01* | (2006.01) |
| *F16B 2/10* | (2006.01) |
| *F16M 13/02* | (2006.01) |
| *A47B 96/02* | (2006.01) |

(52) U.S. Cl.
CPC ............ *A01K 5/01* (2013.01); *A47B 96/022* (2013.01); *F16B 2/10* (2013.01); *F16M 13/025* (2013.01)

(58) Field of Classification Search
CPC ...... A01K 5/01; A01K 5/0114; F16M 13/025; F16B 2/10; A47B 96/022
USPC .............. 248/312.1, 222.13, 221.11, 222.11; 119/61.57, 51.01, 61.5; 220/694, 737, 220/751, 908; 108/42
See application file for complete search history.

(56) References Cited

U.S. PATENT DOCUMENTS

| | | | | |
|---|---|---|---|---|
| 3,205,861 A | * | 9/1965 | Moore | ................... A01K 5/008 |
| | | | | 119/61.3 |
| 3,329,321 A | | 7/1967 | Moore | |
| 5,133,293 A | * | 7/1992 | Boozer | ................... A01K 5/01 |
| | | | | 119/61.57 |
| 6,231,019 B1 | * | 5/2001 | Broste | ..................... A01K 5/01 |
| | | | | 248/291.1 |
| 8,998,008 B1 | * | 4/2015 | Robertson | ............ A47B 96/022 |
| | | | | 108/42 |
| 2008/0224004 A1 | * | 9/2008 | Gallien | ................ A47B 96/022 |
| | | | | 248/220.1 |

FOREIGN PATENT DOCUMENTS

GB      695990      8/1953

* cited by examiner

*Primary Examiner* — Todd M Epps
(74) *Attorney, Agent, or Firm* — Mai-Tram D. Lauer; Westman, Champlin & Koehler, PA (57) ABSTRACT

An apparatus is configured to allow removable attachment of a container to a structure. The apparatus includes a mount, a retainer, and a first fastener. The mount includes a first leg including a first plurality of apertures; and a first latch portion. The retainer is pivotally connected to the mount and includes a second latch portion configured for cooperation with the first latch portion. The first fastener is configured to pass through one of the plurality of apertures and a first portion of the container. A method is described for removably attaching a container to a bracket located at a corner of a stall. The method includes aligning a hole of the container with a peg of the mount, passing the peg through the hole, closing the bracket by moving the retainer relative to the mount, and securing the mount and retainer in a closed configuration.

16 Claims, 11 Drawing Sheets

CORNER FEEDER BRACKET

CROSS REFERENCE TO RELATED APPLICATION

This application claims the benefit of priority from U.S. Provisional Patent Application No. 62/324,732, filed on Apr. 19, 2016, entitled "Corner Feeder Bracket," which is hereby incorporated in its entirety.

BACKGROUND

Figure 1:
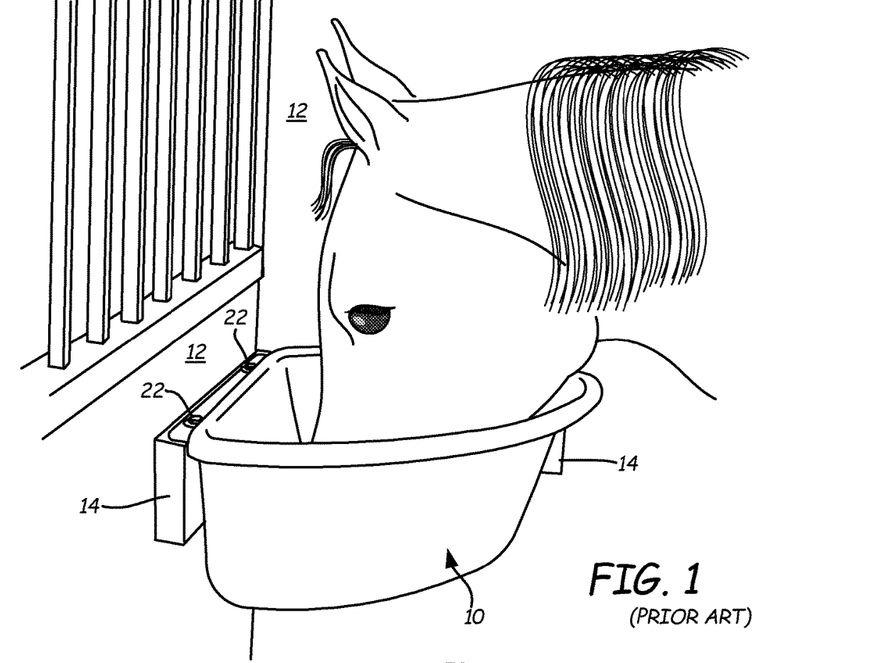
FIG. 1 is a perspective view of a feeder container mounted to a corner of an animal stall in a conventional manner.

FIG. 1 is a perspective view of an animal using a feeder container 10 installed in a conventional manner to interior walls 12 of an enclosure such as an animal stall. In the illustrated view, container 10 has a configuration designed for mounting at a corner where walls 12 meet. A stud 14 is attached to each wall 12, such as by permanent mounting via fasteners such as screws or bolts.

Figure 2:
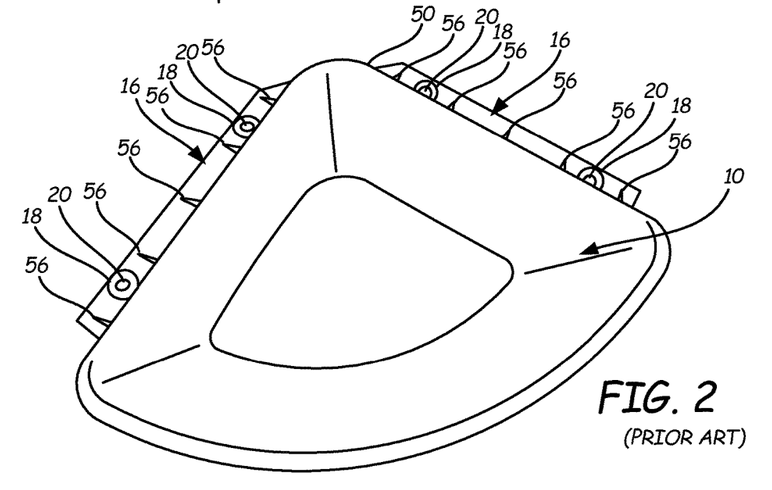
FIG. 2 is a top perspective view of the feeder of FIG. 1.

FIG. 2 is a top view of a conventional container 10 having two flanges 16 on which grommets 18 are mounted to reinforce apertures 20. An especially suitable container 10 is commercially available from Fortex/Fortiflex of Miami, Okla., under the model number CF-24 (24 quart corner feeder). An exemplary container 10 is, as shown, formed as a quadrant of a circle, and has dimensions including a height of about 9⅝ inches, a radius of about 16 inches, and a quarter circumference dimension of about 23 inches.

As shown in FIG. 1, container 10 in a conventional use is permanently mounted to studs 14 by bolts 22 fastened through grommets 18. Thus attached, container 10 is usually cleaned in place, such as by wiping out an interior of container 10 with a damp cloth. Such cleaning methods may be labor intensive, sometimes not easily performed because of accessibility issues, physically awkward, and often insufficient for disinfecting the container 10, in order to inhibit the spread of disease and illness-causing organisms such as viruses and bacteria.

SUMMARY

In one aspect, an apparatus is configured to allow removable attachment of a container to a structure. The apparatus includes a mount, a retainer, and a first fastener. The mount includes a first leg including a first plurality of apertures; and a first latch portion. The retainer is pivotally connected to the mount and includes a second latch portion configured for cooperation with the first latch portion. The first fastener is configured to pass through one of the plurality of apertures and a first portion of the container.

In another aspect, a method is described for removably attaching a container to a bracket located at a corner of a stall at which first and second walls meet. The bracket includes a mount and a retainer. The method includes aligning a hole of the container with a peg of the mount, passing the peg through the hole, closing the bracket by moving the retainer relative to the mount, and securing the mount and retainer in a closed configuration.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as above, below, over, under, top, bottom, side, right, left, horizontal, vertical, etc., are used, it is to be understood that they are used only for ease of understanding the description. It is contemplated that structures may be oriented otherwise.

DETAILED DESCRIPTION

The current disclosure is directed to exemplary embodiments of an apparatus in the form of a bracket for removably attaching a feeder container to a corner of an animal stall. The bracket allows for easy and quick removal of the feeder container for cleaning and refilling. In many husbandry operations, such feeder containers are deployed in many locations, including individual animal stalls. In a conventional operation, a user typically carries a large, heavy bag of feed around a barn, scooping out an appropriate amount of the feed material for deposition into each of the many feed containers. When the containers are to be cleaned, they are typically wiped out individually with damp cloths. A single cleaning cloth or towel may be used for several or all of the containers. In this conventional practice, germs may be inadvertently spread from one container to another. Moreover, such a cleaning method may be insufficient for killing or otherwise eliminating germs and other carriers of disease. Additionally, such a cleaning method must take place in the very location (i.e., the animal stall) where such undesirable organisms are already resident.

The current disclosure describes a mounting bracket for removably yet securely mounting a feed container at a corner where walls of an animal stall meet. Because brackets of the present disclosure allow for quick and easy removal of the feed containers from the stalls, such use can lead to increased efficiencies in husbandry operations, operator convenience, and more effective sanitation. For example, many of the feed containers of an operation can be moved to a central location where they can be disinfected (such as by the use of chemical or radiative methods), pressure washed, and left to dry in the sun. For filling, the many clean feed containers can be filled with feed material at a central location and then transported back to the individual stalls on a wagon, for example. Ease of removal of individual feed containers from the disclosed bracket also allows for easy replacement of the containers when needed. While a particular configuration of the disclosed bracket is illustrated, it is contemplated that the teachings described herein can also be applied to brackets of different configurations to accommodate feed containers having different shapes, dimensions and attachment features.

Figure 3:
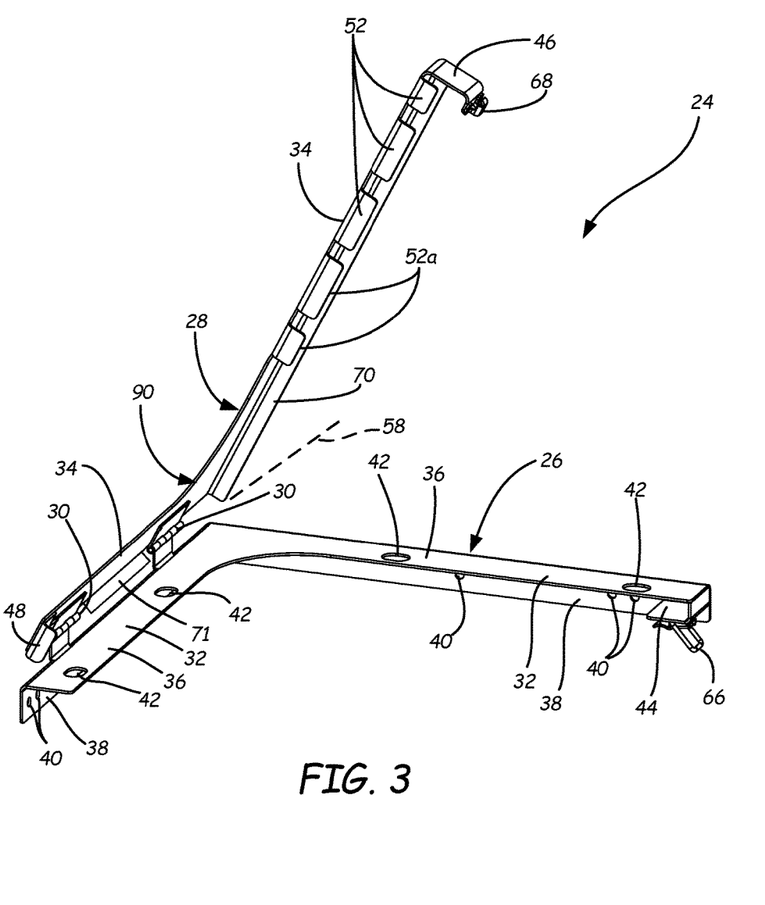
FIG. 3 is a perspective view of an exemplary embodiment of a bracket for removably mounting the feeder container of FIG. 2, in a partially open configuration.

As shown in FIG. 3, in an exemplary embodiment, bracket 24 includes mount 26 and retainer 28 joined by one or more hinges 30. In the illustrated embodiment, each mount 26 includes two legs 32 that meet at a right angle. Similarly, retainer 28 includes two legs 34 that meet at a right angle. In an exemplary embodiment, each leg 32 is a right angle member having a horizontal flange 36 and a vertical flange 38. Vertical flanges 38 include apertures 40 through which fasteners such as lag screws can be used to secure bracket 24 to studs 14 of the animal stall. Horizontal flange 36 of mount 26 includes apertures 42 through which fasteners may be inserted to also pass through apertures 20 of container 10 for retaining container 10 on bracket 24 (see FIGS. 2 and 10). An end of one leg 32 includes end piece 44 which in an exemplary embodiment is configured to form a channel, wherein a bottom surface of end piece 44 supports a first latch portion 66.

Retainer 28 includes end piece 46 at an end of a leg 34, wherein in an exemplary embodiment, a cooperating second latch portion 68 is located. On the other leg 34, at an opposite end, end piece 48 is optionally provided in a flange or channel configuration. Such an end piece 48 helps to maintain retainer 28, when in the closed configuration shown in FIGS. 8A-9B and 12, approximately level and even with an upper rim 50 of container 10. As shown in an exemplary embodiment, a top surface of mount 26 is substantially planar, and a top surface of retainer 28 is substantially planar. A plurality of flanges 52 can be provided to extend substantially orthogonally from an inner edge of leg 34. Gaps 54 are provided between adjacent flanges 52 to allow clearance of ribs 56 on each flange 16 of container 10, labeled in FIG. 2. While not shown in the illustrated embodiment, it is to be understood that such flanges 52 can similarly be provided on the other leg 34 of retainer 28.

One or more of legs 34 can additionally include strengthening flanges 70, 71, which in an exemplary embodiment extend substantially orthogonally from an outer edge of the top surface of leg 34 and is oriented substantially parallel to flanges 52 of the same leg 34 (where provided). In an exemplary embodiment, flange 70 extends substantially an entire length of its respective leg 34, while flange 71 extends between hinges 30 of its respective leg 34.

Figure 4:
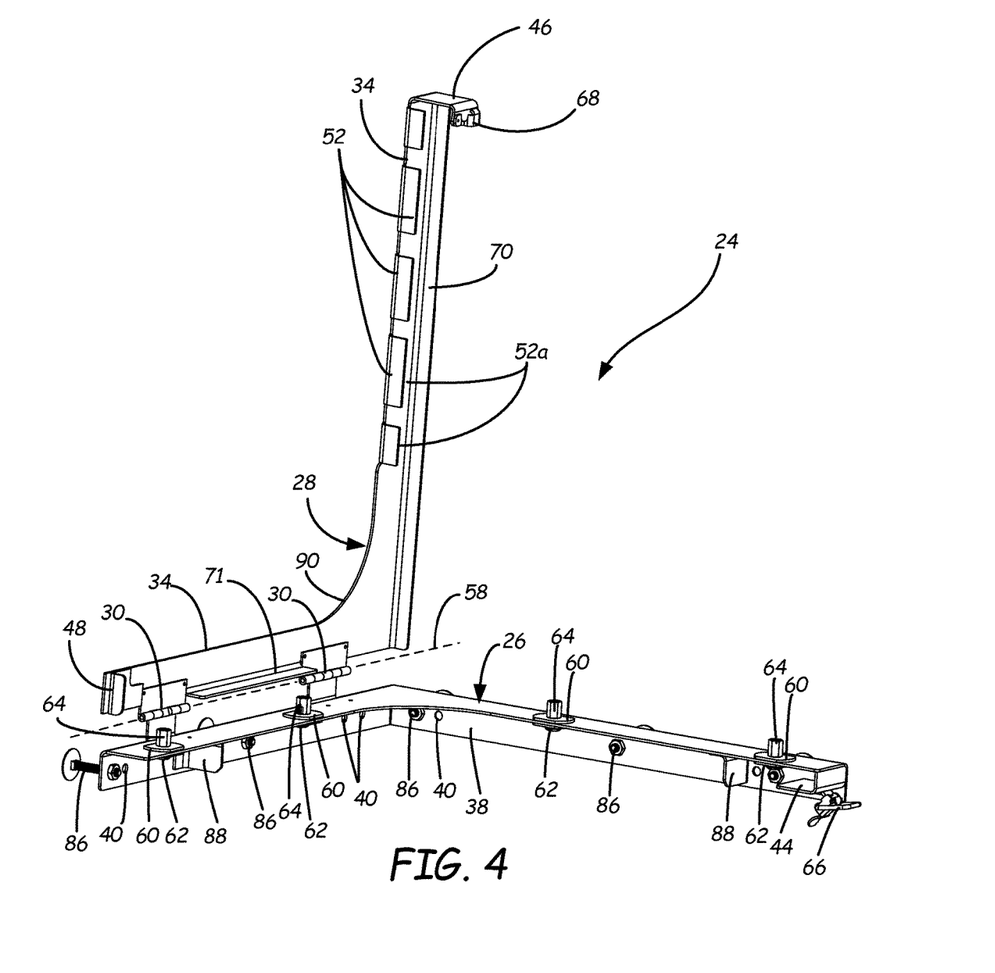
FIG. 4 is a perspective view of the exemplary bracket in an open configuration, and including fasteners.
Figure 5:
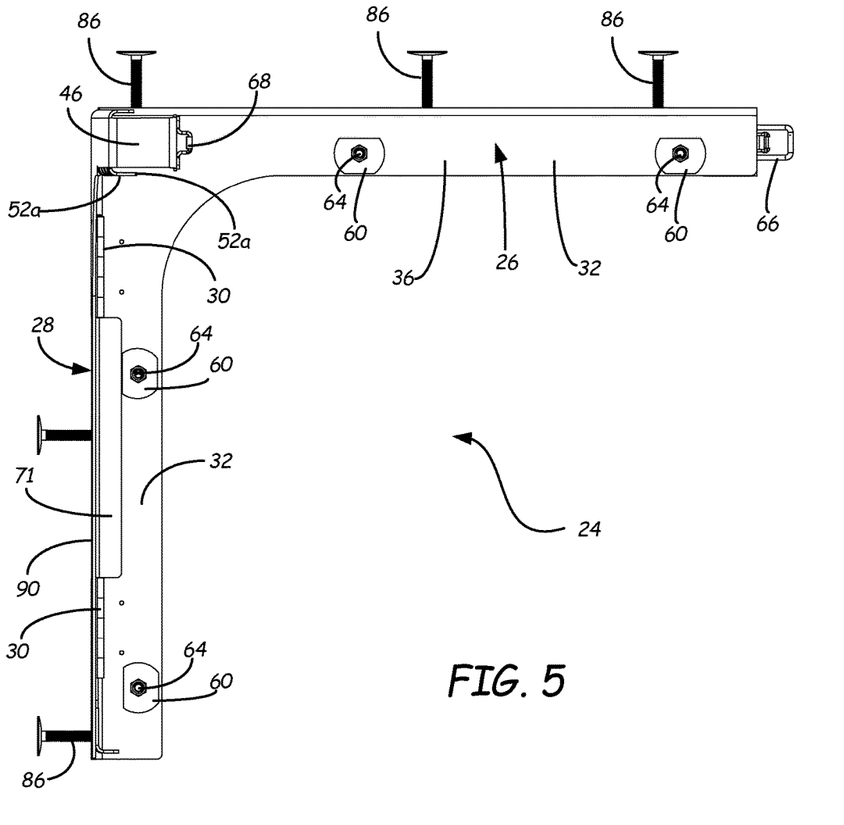
FIG. 5 is a top view of the exemplary bracket.
Figure 6:
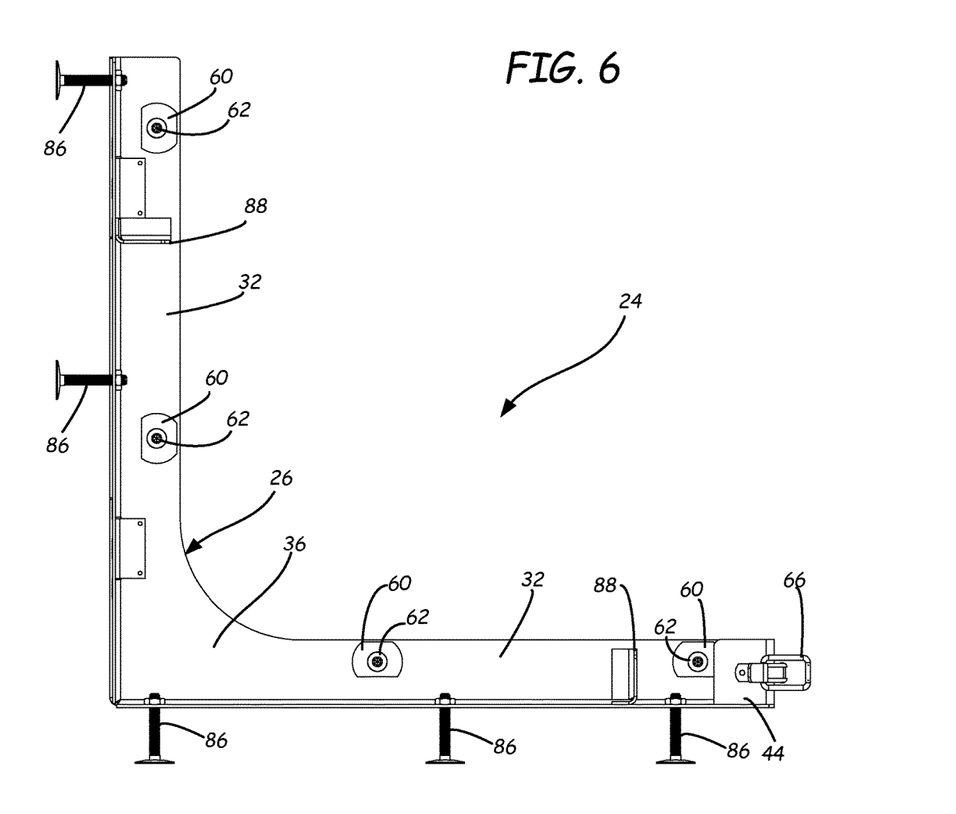
FIG. 6 is a bottom view of the exemplary bracket.
Figure 7A:
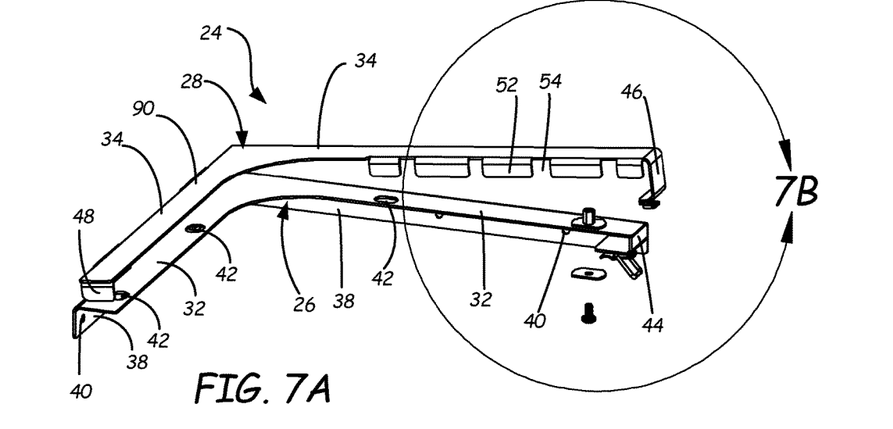
FIG. 7A is a perspective view of the exemplary bracket in a partially closed configuration.
Figure 7B:
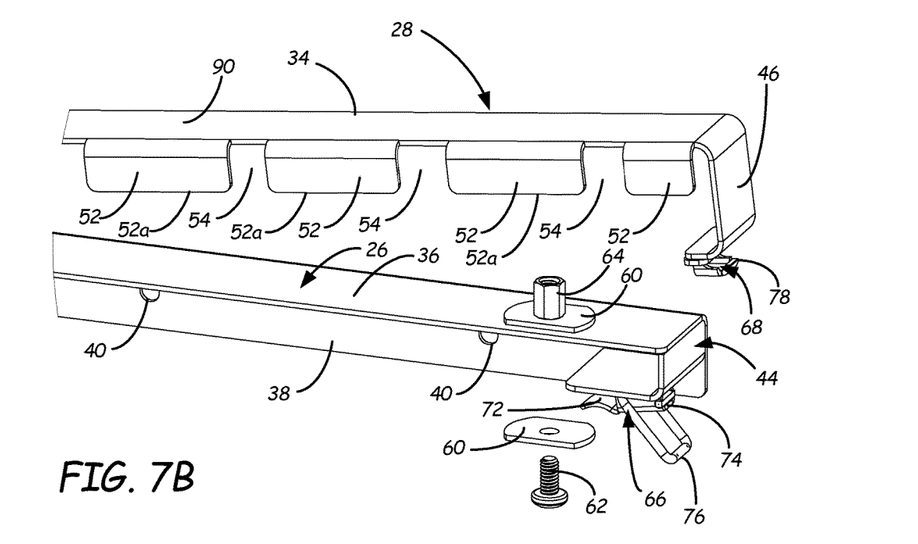
FIG. 7B is an enlarged partial view of the encircled portion of FIG. 7A.
Figure 8A:
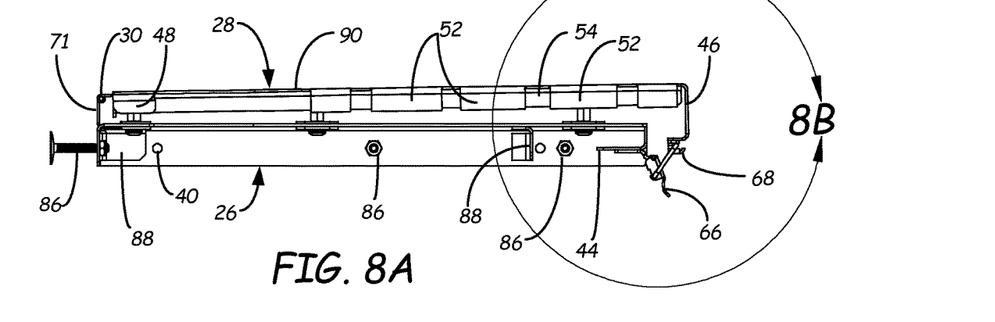
FIG. 8A is a side view of the exemplary bracket in a closed configuration.
Figure 8B:
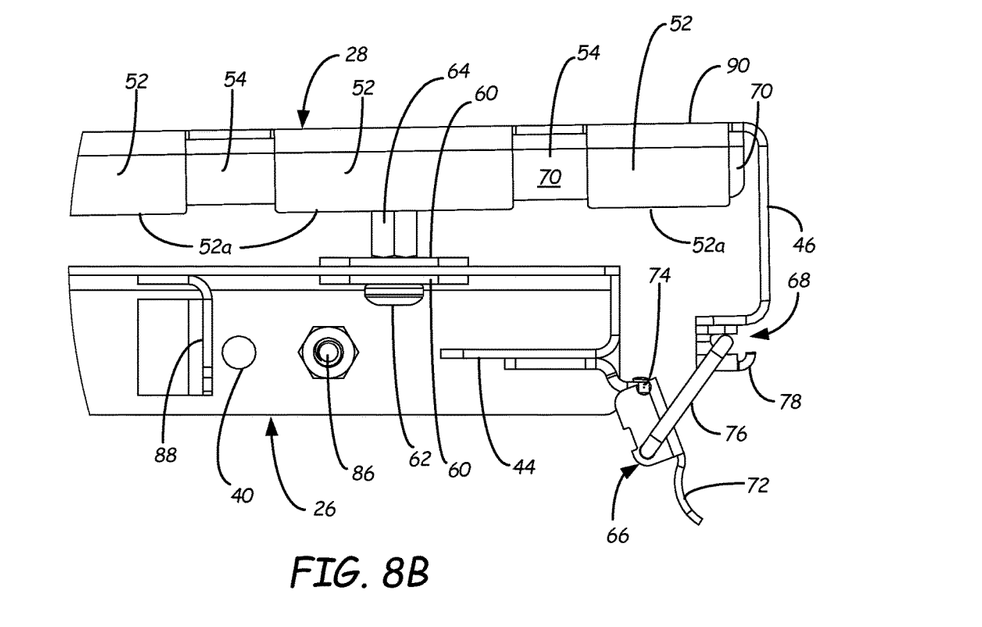
FIG. 8B is an enlarged partial view of the encircled portion of FIG. 8A.
Figure 9A:
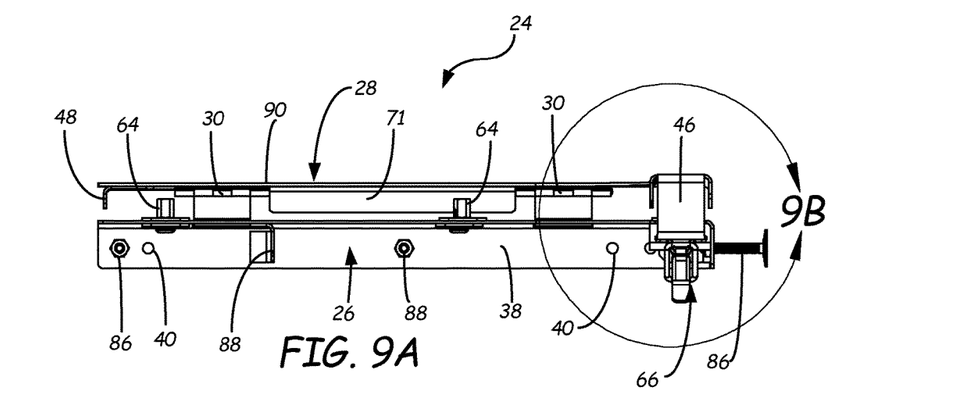
FIG. 9A is a front view of the exemplary bracket in a closed configuration.
Figure 9B:
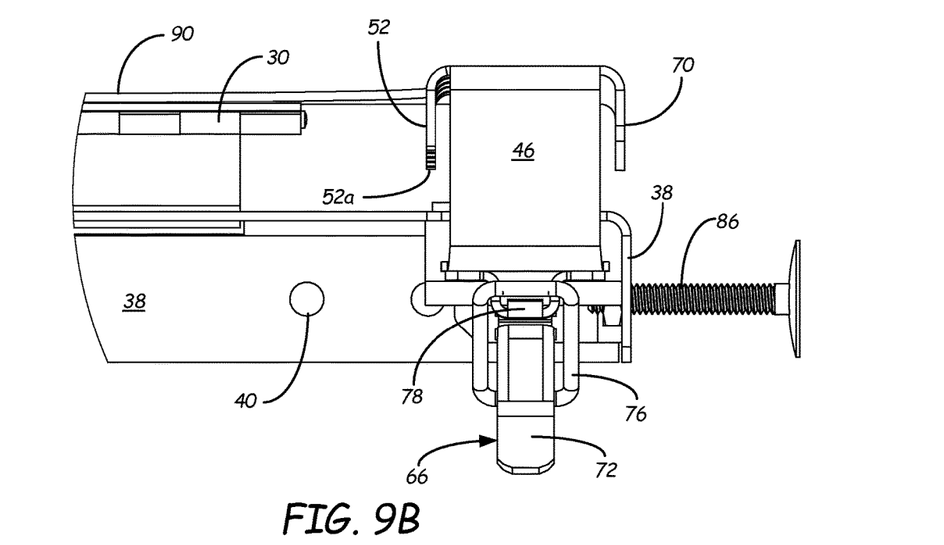
FIG. 9B is an enlarged partial view of the encircled portion of FIG. 9A.
Figure 10:
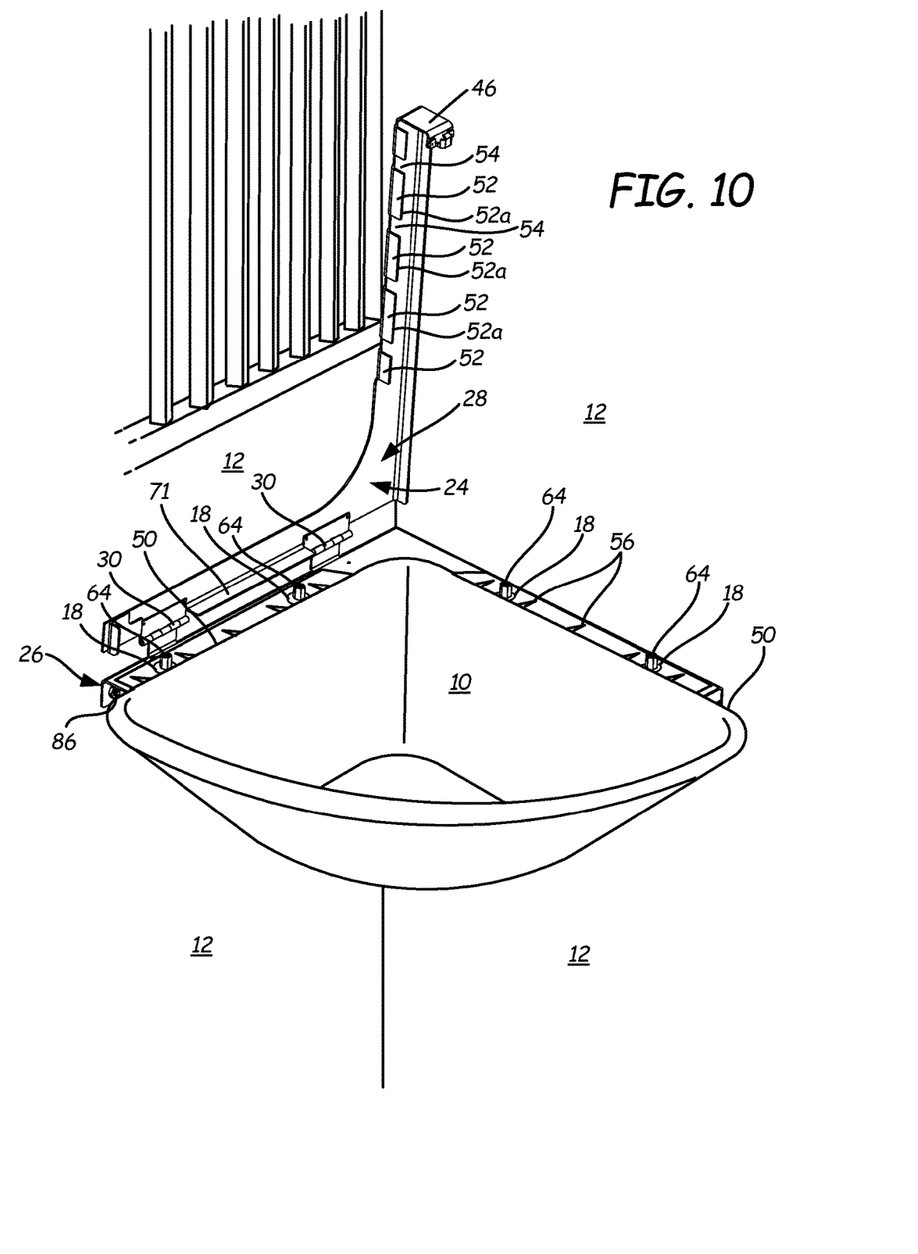
FIG. 10 is a top perspective view of a feeder container mounted to a corner of an animal stall using the exemplary bracket, in an open configuration.

As shown in FIGS. 3 and 4, and with reference to container 10 shown in FIGS. 2 and 10, apertures 42 are provided in horizontal flanges 36 for acceptance of a fastener assembly to couple with apertures 20 of container 10. As shown in FIGS. 4-7B, an exemplary fastener assembly includes the use of a washer 60 on each side of horizontal flange 36, a screw 62 that passes through aperture 42 and washers 60, and a coupler nut 64 that is threadably engaged with a shaft of the screw 62. Each aperture 42 is larger than a shaft of screw 62, such as being wider and/or elongated compared to the screw shaft dimension, to allow for slight variations in the positioning of nuts 64 relative to flange 36. Thus, positions of each nut 62 and distances between nuts 64 on mount 26 can be adjusted. This adjustability accommodates slight variations in spacing on container 10 of apertures 20 and corresponding grommets 18. Washers 60 allow for the secure attachment of screw 62 and nut 64 to opposite sides of horizontal flange 36, through the oversized apertures 42. In an exemplary embodiment, each washer 60 is clipped on opposite sides thereof to have flat surfaces that do not extend beyond the width of horizontal flange 36.

As shown in FIG. 10, nut 64 serves as a peg on which grommets 18 of container 10 can be received for mounting container 10 on bracket 24. Because the spacing between grommets 18 can differ from one container 10 to another container, a user may label a particular container for use in a particular stall, so an exact fit is achieved with each removal and reinstallation of container 10 on a particular bracket 24, without requiring readjustment of the fastener assemblies at apertures 42. While a particular embodiment of a fastener in the form of a coupler nut is shown and described, it is contemplated that other fasteners such as dowels and studs, for example, could also be used.

Figure 11:
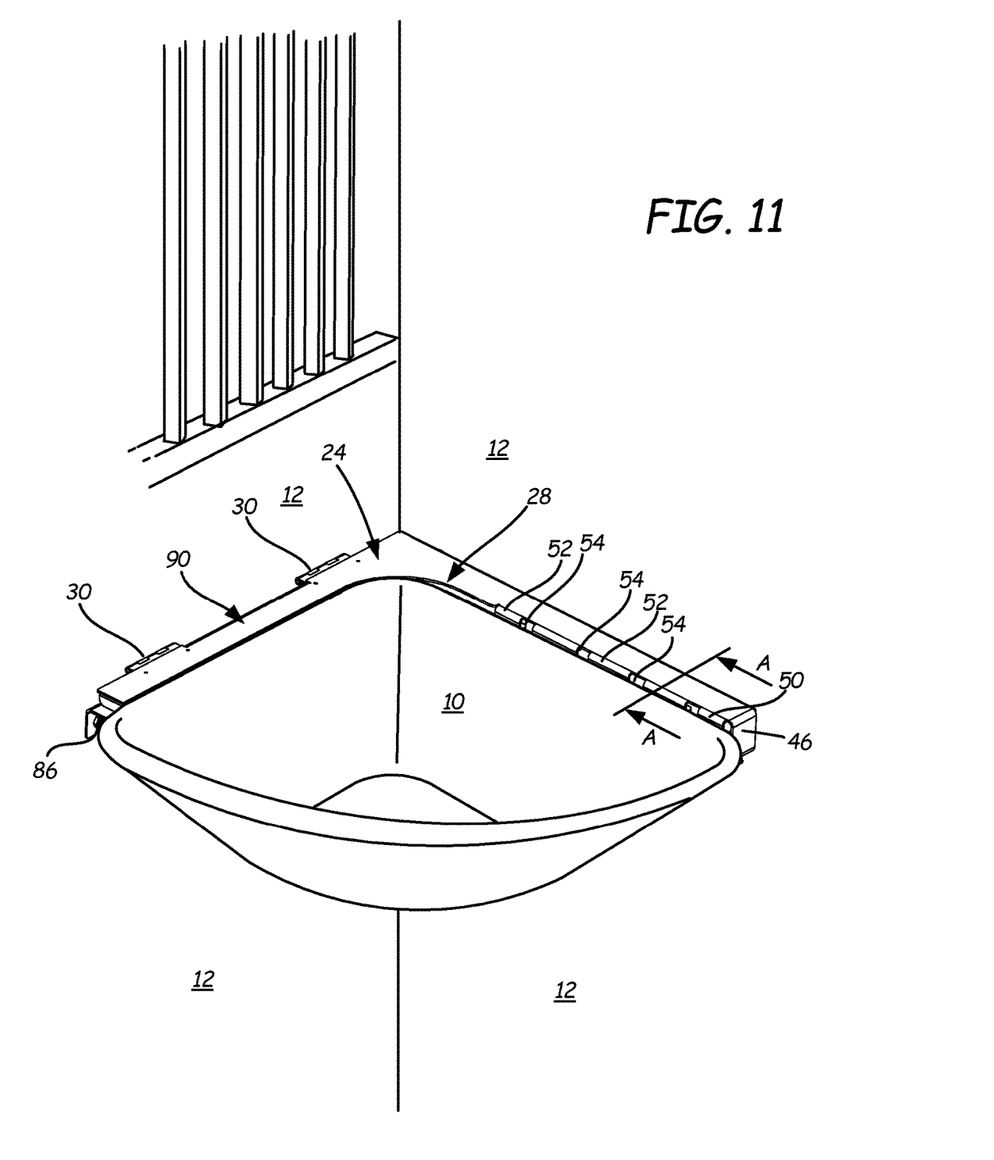
FIG. 11 is a perspective view of the feeder container and exemplary bracket of FIG. 10, with the bracket in a closed configuration.

As shown in FIG. 10, bracket 24 is installed at a corner of an enclosure (which does not need to be fully enclosed) such as a stall in at which first and second walls 12 meet. Such installation may be accomplished by inserting fasteners 86 through apertures 40 and through or into walls 12 (or other suitable mounting structures affiliated with walls 12, such as studs, for example). Mount 26 can optionally include lower flanges 88 to provide additional strength and structural stability of mount 26. Container 10 is removably attached to bracket 24 by aligning apertures 20 of container 10 with pegs or nuts 64, which are attached via apertures 42 to mount 26. The pegs or nuts 64 are passed through the apertures 20 of container 10. Retainer 28 can be moved from the open position shown in FIGS. 4 and 10; to the partially open positions shown in FIGS. 3, 7A and 7B; and to a closed position shown in FIGS. 8A-9B, 11 and 12, about pivot axis 58 of hinges 30. As shown in FIGS. 10 and 11, after container 10 is placed on mount 26 of bracket 24, bracket 24 is closed by pivoting retainer 28 downward about hinges 30 to the closed configuration shown in FIGS. 8A-9B, 11 and 12. When in this closed configuration, edges 52a of flanges 52 engage a top surface of flange 16 of container 10 to firmly retain container 10 on top of horizontal flange 36 of mount 26. Similarly, end piece 48 and/or flanges 70, 71 of retainer 28 may engage a top surface of flange 16 of container 10.

As shown in FIGS. 3 and 7A-9B, end piece 46 of retainer 28 is lowered proximate to end piece 44 of mount 26. A first latch portion 66 is provided on end piece 44, while a second latch portion 68 is provided on end piece 46. After retainer 28 is pivoted down toward mount 26, the first and second latch portion 66, 68 can be secured together in a known manner to retain bracket 24 in the closed configuration of FIGS. 8A-9B, 11 and 12. A suitable stainless steel draw latch is commercially available from Allegis Corporation as part number LA11224 SS. While a particular configuration of latch portions 66, 68 are illustrated, it is to be understood that various other forms of latches or mechanical interlocking components can also be used, including simple hook and eyelet closures or hook and loop fasteners, for example. In an exemplary embodiment, the latch portions 66, 68 are provided on an underside of bracket 24, so that the latch portions do not protrude in a way that is vulnerable to contact by the animal. However, the latch portions so positioned are easily accessed by a human user for opening, closing, and manipulation of the bracket 24.

As illustrated, latch portions 66, 68 are elements of a conventional draw latch. Latch portion 66 includes thumb plate 72, which can be pivoted about axis 74 to move and position loop 76 into and out of engagement with hook 78 of latch portion 68. After loop 76 is engaged with hook 78, thumb plate 72 is moved toward the left in FIG. 8B and remains in that position by a biasing mechanism (not labeled).

Figure 12:
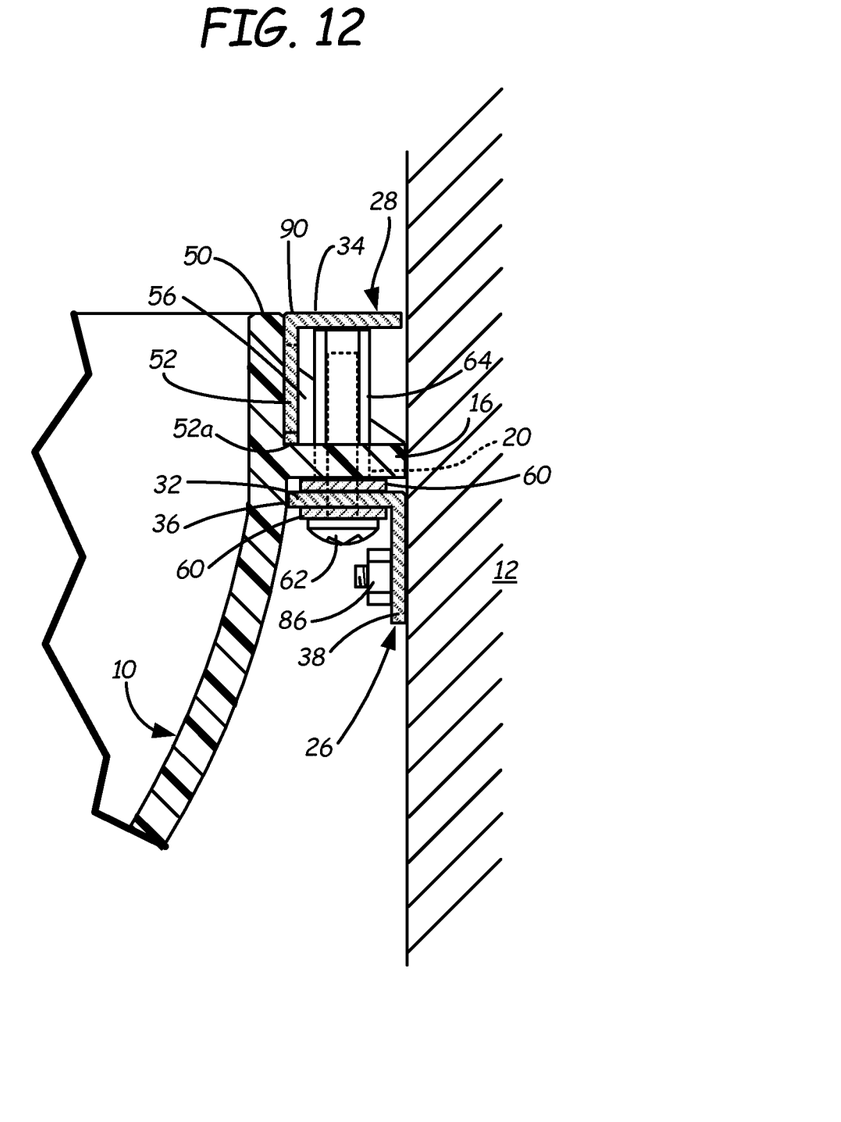
FIG. 12 is a cross-sectional view of the feeder container and exemplary bracket, taken along line A-A of FIG. 11.

As shown in FIGS. 11 and 12, when bracket 24 is in a closed configuration, a top surface of retainer 28 is approximately flush with upper rim 50 of container 10, thereby providing a smooth surface with no sharp edges, wherein bracket 24, and the seams between bracket 24 and container 10, are not susceptible to the accumulation of feed material or other debris. Flange 71 also serves to maintain the level relationship between rim 50 of container 10 and a top surface of retainer 28, as flange 71 abuts wall 12 when bracket 24 is closed, thereby preventing over-rotation of retainer 28 relative to mount 26 about axis 58 of hinges 30. In an exemplary embodiment, bracket 24 is formed of stainless steel, which beneficially is resistant to corrosion, durable, readily available, and amenable to conventional forming techniques. However, it is contemplated that other materials may also be used, including but not limited to polymers and other metals such as aluminum and brass, and combinations of materials.

While an exemplary bracket 24 may be substantially permanently affixed to walls 12 in a corner of an animal stall, it can be seen that by the manipulation of latch portions 66, 68 and the opening and closing of retainer 28 relative to mount 26, container 10 can be easily removed and replaced for filling and cleaning operations. Moreover, the described structures lead to rigidity in the closed bracket 24, thereby securely holding container 10. When some animals encounter parts that move with respect to each other, the animals are enticed to attempt to separate the parts. Thus, a secure connection between bracket 24 and container 10 discourages tampering or dislodgement by the animals.

An exemplary, non-limiting embodiment of an apparatus 24 is described to allow for removable attachment of a container 10 to a structure 12, the apparatus 24 including a mount 26, a retainer 28, and a fastener 64. Mount 26 includes a first leg 32 including a first plurality of apertures 42 and a first latch portion 66. Retainer 28 is pivotally connected to the mount 26 and includes a second latch portion 68 configured for cooperation with the first latch portion 66. A first fastener 62 is configured to pass through one of the plurality of apertures 42 and a first portion of the container 10. In an exemplary embodiment, bracket 24 further includes a second fastener 62 configured to pass through a second of the plurality of apertures 42 and a second portion of the container 10. In an exemplary embodiment, a distance between the first and second fasteners 62 is adjustable.

In an exemplary embodiment, the mount 26 further includes a second leg 32 including a second plurality of apertures 42. In an exemplary embodiment, the first and second legs 32 are oriented at a right angle with respect to each other.

In an exemplary embodiment, the retainer 28 further includes third and fourth legs 34 oriented at a right angle with respect to each other. In an exemplary embodiment, the third leg 34 includes a substantially planar surface 90 and a plurality of first flanges 52 extending substantially orthogonally from a first edge the surface 90. In an exemplary embodiment, adjacent flanges 52 are separated by a gap 54.

In an exemplary embodiment, a second flange 70 extends substantially orthogonally from a second edge the surface 90. In an exemplary embodiment, the second flange 70 is substantially parallel to at least one of the plurality of first flanges 52. In an exemplary embodiment, the substantially planar surface 90 extends to the fourth leg 34, and the apparatus 24 includes a second flange 71 extending substantially orthogonally from an edge of the surface at the fourth leg 34.

An exemplary embodiment of a method is described for removably attaching a container 10 to a bracket 24 located at a corner of an enclosure at which first and second walls 12 meet, wherein the bracket 24 includes a mount 26 and a retainer 28. The method includes aligning a hole 20 of the container 10 with a peg 64 of the mount 26; passing the peg 64 through the hole 20; closing the bracket 34 by moving the retainer 28 relative to the mount 26; and securing the mount 26 and retainer 28 in a closed configuration. In an exemplary embodiment, securing the mount 26 and retainer 28 in a closed configuration includes latching together a first latch portion 66 located on the mount 26 and a second latch portion 38 located on the retainer 28. In an exemplary embodiment, aligning the hole 20 of the container 10 with the peg 64 of the mount 26 includes adjusting a position of the peg 64 on the mount 26. In an exemplary embodiment, closing the bracket 24 includes pivoting the retainer 28 about a hinge 30 connecting the retainer 28 and the mount 26. In an exemplary embodiment, the method further includes attaching the bracket 24 to the first and second walls 12.

Although the subject of this disclosure has been described with reference to several embodiments, workers skilled in the art will recognize that changes may be made in form and detail without departing from the scope of the disclosure.

What is claimed is:

1. An apparatus configured to allow removable attachment of a container to a structure, the apparatus including:
   a mount including:
      a first leg including a first plurality of apertures; and
      a first latch portion;
   a retainer pivotally connected to the mount and including a second latch portion configured for cooperation with the first latch portion; and
   a first fastener configured to pass through one of the plurality of apertures and a first portion of the container.

2. The apparatus of claim 1 wherein the mount further includes a second leg including a second plurality of apertures.

3. The apparatus of claim 2 wherein the first leg and the second leg are oriented at a right angle with respect to each other.

4. The apparatus of claim 3 wherein the retainer further includes third and fourth legs oriented at a right angle with respect to each other.

5. The apparatus of claim 4 wherein the third leg includes:
a substantially planar surface; and
a plurality of first flanges extending substantially orthogonally from the substantially planar surface.

6. The apparatus of claim 5 wherein adjacent flanges of the plurality of first flanges are separated by a gap.

7. The apparatus of claim 5 further including a second flange extending substantially orthogonally from a second edge the surface.

8. The apparatus of claim 7 wherein the second flange is substantially parallel to at least one of the plurality of first flanges.

9. The apparatus of claim 5, wherein the substantially planar surface extends to the fourth leg, and wherein the apparatus includes a second flange extending substantially orthogonally from an edge of the surface at the fourth leg.

10. The apparatus of claim 1 further including a second fastener configured to pass through a second of the plurality of apertures and a second portion of the container.

11. The apparatus of claim 10 wherein a distance between the first and second fasteners is adjustable.

12. A method for removably attaching a container to a bracket located at a corner of an enclosure at which first and second walls meet, wherein the bracket includes a mount and a retainer, the method including:
aligning a hole of the container with a peg of the mount;
passing the peg through the hole;
closing the bracket by moving the retainer relative to the mount; and
securing the mount and retainer in a closed configuration.

13. The method of claim 12 wherein securing the mount and retainer in a closed configuration includes latching together a first latch portion located on the mount and a second latch portion located on the retainer.

14. The method of claim 12 wherein aligning the hole of the container with the peg of the mount includes adjusting a position of the peg on the mount.

15. The method of claim 12 wherein closing the bracket includes pivoting the retainer about a hinge connecting the retainer and the mount.

16. The method of claim 12 further including attaching the bracket to the first and second walls.

* * * * *